United States Patent
Xu et al.

(10) Patent No.: US 9,566,559 B2
(45) Date of Patent: Feb. 14, 2017

(54) FLUID DISTRIBUTION DEVICE AND METHOD FOR MULTIBED REACTORS

(71) Applicant: UOP LLC, Des Plaines, IL (US)

(72) Inventors: Zhanping Xu, Inverness, IL (US); Pengfei Chen, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 147 days.

(21) Appl. No.: 14/299,452

(22) Filed: Jun. 9, 2014

(65) Prior Publication Data
US 2015/0001742 A1    Jan. 1, 2015

Related U.S. Application Data

(60) Provisional application No. 61/840,543, filed on Jun. 28, 2013.

(51) Int. Cl.
   *B01J 8/04*    (2006.01)
   *B01J 8/02*    (2006.01)

(52) U.S. Cl.
   CPC ............ *B01J 8/0278* (2013.01); *B01J 8/0492* (2013.01)

(58) Field of Classification Search
   CPC ............ B01J 8/04; B01J 8/0492; B01J 10/00; B01F 3/04
   USPC ............ 422/220, 224, 606, 607; 261/114.5, 261/114.2, 116
   See application file for complete search history.

(56) References Cited

U.S. PATENT DOCUMENTS

| | | | |
|---|---|---|---|
| 3,541,000 A * | 11/1970 | Hanson | B01D 51/10 208/108 |
| 4,836,989 A | 6/1989 | Aly | |
| 5,837,208 A | 11/1998 | Grott | |
| 7,045,103 B2 * | 5/2006 | McDougald | B01J 8/0492 239/558 |
| 8,177,198 B2 | 5/2012 | Sechrist | |
| 8,181,942 B2 | 5/2012 | Sechrist | |
| 8,337,787 B2 * | 12/2012 | Augier | B01J 8/0453 422/220 |
| 2002/0039547 A1 | 4/2002 | Nelson | |
| 2006/0257300 A1 | 11/2006 | Breivik | |
| 2009/0324464 A1 | 12/2009 | Sechrist | |

FOREIGN PATENT DOCUMENTS

WO    2013017804 A1    2/2013

OTHER PUBLICATIONS

PCT International Search Report for PCT/US2014/044245 dated Oct. 20, 2014.
U.S. Appl. No. 14/299,485, filed Jun. 9, 2014.
U.S. Appl. No. 14/299,298, filed Jun. 9, 2014.
U.S. Appl. No. 14/299,373, filed Jun. 9, 2014.
U.S. Appl. No. 14/299,401, filed Jun. 9, 2014.

* cited by examiner

Primary Examiner — Robert A Hopkins

(57) ABSTRACT

A fluid distribution device is presented for the collection and distribution of fluid between reactor beds. According to various aspects, the device includes a collection tray, a mixing chamber in fluid communication with the collection tray, a rough distribution tray in fluid communication with the mixing chamber, and a fine distribution tray in fluid communication with the rough distribution tray. The rough distribution tray includes a vapor chimney.

20 Claims, 4 Drawing Sheets

FLUID DISTRIBUTION DEVICE AND METHOD FOR MULTIBED REACTORS

CROSS REFERENCE TO RELATED APPLICATION

This application claims the benefit of U.S. Provisional Application No. 61/840,543 which was filed on Jun. 28, 2013, the contents of which are hereby incorporated by reference in its entirety.

FIELD OF THE INVENTION

This invention relates to co-current flow reactors where a liquid flows with a vapor through a fixed bed of catalyst. In particular, this relates to the internal components for controlling the flow of fluid through the reactor when there are multiple reactor beds, and for redistribution of the fluids.

BACKGROUND OF THE INVENTION

A wide variety of processes use co-current flow reactors, where a fluid or fluids flow over a solid bed of particulate materials, to provide for contact between the fluid and solid particles. In a reactor, the solid may comprise a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, hydrocracking and hydrotreating.

Co-current reactors with fixed beds are constructed such that the reactor allows for the fluid to flow over the catalyst bed. When the fluid is a liquid, or liquid and vapor mixture, the fluid is usually directed to flow downward through the reactor. Multibed reactors are also frequently used, where the reactor beds are stacked over one another within a reactor shell. Typically, they are stacked with some space between the beds.

The interbed spaces are often created to provide for intermediate treatment of the process fluid, such as cooling, heating, mixing and redistribution.

In exothermic catalytic reactions, the control of fluid temperature and distribution is important. The temperature and composition of the fluids from an upper catalyst bed and from outside of reactor should be well mixed before being distributed to the lower catalyst bed. Initial poor temperature and composition distribution at top of a catalyst bed can persist or grow as the process fluids move down the reactor. Hot spots can develop and cause rapid deactivation of the catalyst and shorten the reactor cycle length. The space between catalyst beds is for the injection of a quench gas or liquid and for fluid mixing and distribution. In hydrocarbon processing, the quench gas is often a cool hydrogen/hydrocarbon stream. However, cooling a fluid without controlling the mixing and distribution leads to uneven reactions and uneven temperature distribution in subsequent reactor beds. And complex mixing and distribution systems takes up valuable space in a reactor chamber holding multiple catalyst beds.

Due to constraints in the height of the space between reactor beds, there is a limited amount of space for introducing a quench fluid and mixing the vapor and liquid along with the quench fluid. Particularly, for existing hydroprocessing reactors, the space between catalyst beds is already set, and sometimes it is difficult to install new internals for improving mixing of fluids within the existing interbed space without reducing the height of catalyst beds. Even for new reactors, it is often desired to reduce the overall size of the reactors to reduce capital expenditure and the profile of the reactor in a processing plant. Therefore, it is desirable to provide for good mixing and distribution of fluids between adjacent catalyst beds in a relatively short interbed space.

The design of reactors to overcome these limitations can save significantly on the valuable space within a reactor for maximizing catalyst loading. Further, it is often desirable to revamp existing reactors to improve processes with the same or reduced quench zone space between catalyst beds. New reactor internals that improve the utilization of the space within a reactor shell can provide significant cost savings, and allow for revamps of existing reactors to meet new operational and regulatory requirements.

SUMMARY OF THE INVENTION

By one aspect, a device is provided for the distribution of fluid over the top of a reactor bed. The device includes a collection tray having a top and a bottom, and having outlet ports therethrough. A mixing chamber is provided in fluid communication with the collection tray outlet ports and has a mixing chamber outlet. A rough distribution tray is in fluid communication with the mixing chamber outlet and has rough distribution tray liquid outlet ports therethrough. The device also includes a distribution tray vapor chimney of the distribution tray positioned radially outwardly of the mixing chamber outlet and an upper opening of the distribution tray vapor chimney above a normal operation liquid level of the distribution tray that provides fluid communication from above to below the rough distribution tray. The vapor chimney also includes a vapor chimney body having a radially inwardly tapered cross section to reduce restriction of outward fluid flow along the rough distribution tray.

By another aspect, a rough distribution device for use in a downflow reactor is provided that includes a rough distribution tray having a generally flat tray with a plurality of liquid outlet ports therethrough. The rough distribution device includes a distribution tray vapor chimney formed about at least one vapor outlet port of the rough distribution tray. The vapor chimney has an upper opening above a normal operating liquid level of the distribution tray and provides fluid communication from above to below the rough distribution tray. The chimney includes a vapor chimney body having a radially inwardly tapered cross section to reduce restriction of outward fluid flow along the rough distribution tray.

By yet another aspect, a method is provided for the distribution of fluid over the top of a reactor bed. The method includes collecting fluid including vapor and liquid from a superior reactor bed. The method also includes passing the fluid into a mixing chamber and swirling the fluid to contact and mix the vapor and liquid and passing the fluid through a generally central mixing chamber outlet to a rough distribution tray. The method further includes collecting the fluid on the rough distribution tray. The method includes passing the vapor radially toward an annular opening between the rough distribution tray and the reactor wall, passing one portion of the vapor through openings of vapor chimneys having inwardly tapering cross sections extending above the rough liquid distribution tray, passing another portion of the vapor through a fluid flowpath formed between adjacent vapor chimneys, and passing the other vapor portion through the annular opening to the fine distribution tray. The method further includes distributing the fluid below the fine distribution tray to another reactor bed.

Other objects, advantages and applications of the present invention will become apparent to those skilled in the art from the following detailed description and drawings.

DETAILED DESCRIPTION OF THE INVENTION

Figure 1:
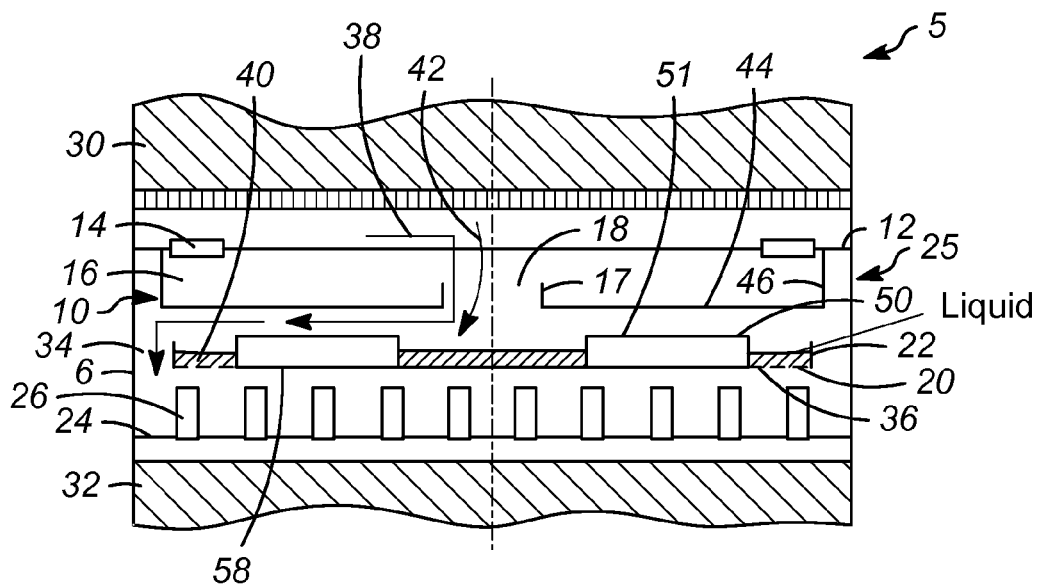
FIG. 1 is a schematic cross-section of a device for the collection, mixing and distribution of fluid between catalyst beds in accordance with various aspects.

According to various aspects, the device and apparatus disclosed herein are disposed in the space between adjacent beds in a co-current flow vessel. For ease of explanation the following will be described in terms of a downflow reactor including two or more spaced catalyst beds, but the distribution and mixing devices and system, and methods described herein may also be used in and applied to other hydrocarbon processing vessels having different types of processing beds. The catalyst beds in a reactor are separated by space for quench, fluid contacting and/or mixing and distribution of the fluids to the subsequent bed, where the mixing zones are designed to cool/heat, mix, and sometimes condense effluent fluids from a catalyst bed above. In one example, as illustrated in FIG. 1, the device and apparatus may be included in a hydroprocessing downflow reactor 5 and fluid flows from superior catalyst bed 30 to an inferior catalyst bed 32. The fluid may include vapor, liquid, or a mixture of vapor and liquid. The reactor fluid may be quenched with a quench gas or liquid (collectively referred to as "quench fluid" herein) from a quench fluid distributor (not shown), and the fluid is contacted, mixed and then distributed to the inferior catalyst bed 32. It should be noted that the term "fluid" as used herein refers to either or both of liquid and vapor. The fluid is contacted and mixed to reduce temperature and to minimize temperature and composition differences before being distributed to the inferior catalyst bed 32 below the mixing zone 25. In current systems, there is considerable space between the reactor beds for quench, mixing, and distribution. A reduction in the amount of space needed for these functions can advantageously provide for maximum catalyst loading within the reactor 5 to improve processing and performance and/or extend operating cycle without replacing an entire reactor. Similarly, new reactors may be designed with smaller profiles and at smaller capital expense if the height of quench zones is minimized.

Good distribution of fluid over catalyst beds is important to avoid adverse effects, such as uneven temperature rise and hot spots within the catalyst bed. Hot spots occurring in the catalyst beds can lead to a shortened catalyst life or to poor product quality. The methods and devices described herein are designed to reduce the height of mixing zone 25 without sacrificing fluid mixing and distribution performance.

Figure 2:
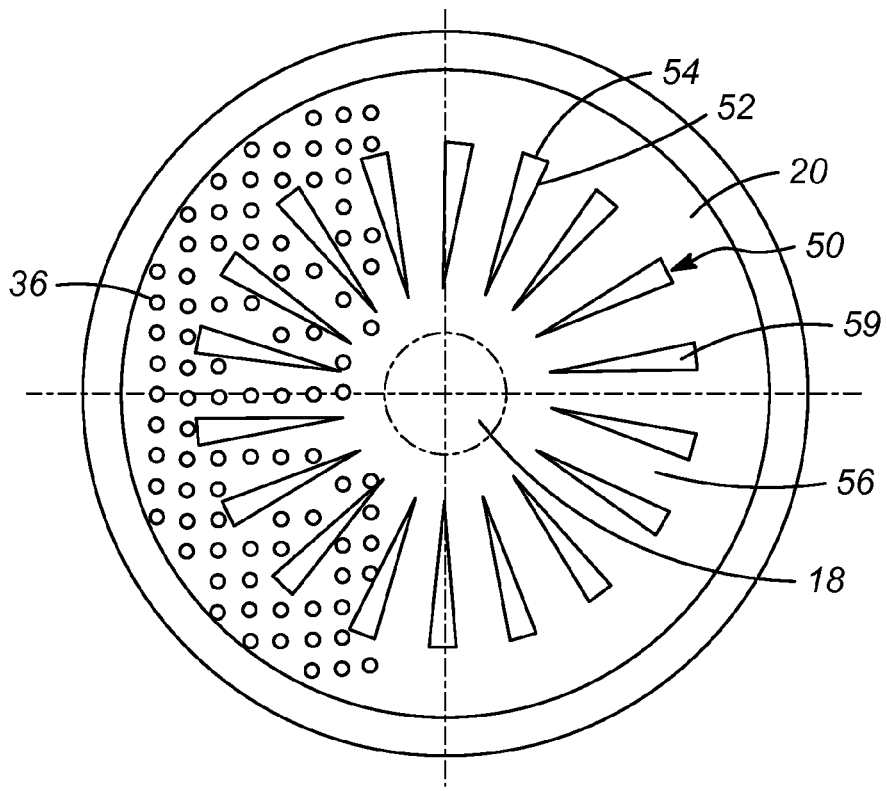
FIG. 2 is a schematic plan view of a rough distribution tray having vapor chimneys in accordance with various aspects.

Turning now to FIGS. 1 and 2, by one aspect a device 10 for the mixing and distribution of fluid over the top of a reactor bed 32 is illustrated. The device 10 is for collecting fluid from a first catalyst bed 30 and redistributing the fluid to a second catalyst bed 32 where the first catalyst bed 30 is above the device 10 and the second catalyst bed 32 is below the device 10. The device 10 includes a collection tray 12 and having outlet ports 14, a mixing chamber 16 in fluid communication with the collection tray 12, and having an outlet 18. The device further includes a rough distribution tray 20 in fluid communication with the mixing chamber outlet 18. The rough distribution tray may include a liquid retention weir 22 at the outer edges of the tray 20 to retain liquid on the tray. The rough distribution tray 20 may be spaced from the reactor walls 6 to provide a generally annular opening 34 between the liquid retention weir 22 and the reactor walls 6 to facilitate the passage of vapor from above the rough distribution tray 20 to below the rough distribution tray 20. The rough distribution tray 20 also includes a plurality of rough distribution tray outlet ports or openings 36 to provide for the flow of liquid therethrough. The device 10 may also include a fine distribution tray 24 positioned below the rough distribution tray 20. The rough distribution tray 20 is in fluid communication with the fine distribution tray 24. The fine distribution tray 24 has a plurality of outlet ports 26 distributed over the tray 24 for providing uniform distribution of fluid to the inferior catalyst bed 32. The outlet ports 26 may include those generally used for fine distribution trays, including, but not limited to sieve trays, bubble caps, and chimney distributors.

The collection tray 12 includes a plurality of outlet ports 14 for delivering fluid to the mixing chamber. The outlet ports 14 can be arrayed circumferentially around the tray 12, with a substantially even spacing. In one approach, there are 4 outlet ports 14. The outlet ports 14 are further designed to deliver the fluid in a direction perpendicular or oblique to the radial direction. The fluid flowing from the outlet ports 14 has a downward and circumferential flow direction as it enters the mixing chamber. The liquid and vapor entering the mixing chamber 16 thus has a swirling motion thereby mixing the fluids within the chamber 16. This creates a process fluid that has a more uniform temperature and composition before redistribution of the liquid and vapor to the catalyst bed 32 below the device 10.

As the process fluid exits the mixing chamber through the outlet 18, the liquid will pass generally downward along path 38 and collect on the rough distribution tray 20 before being distributed through the outlet ports 36. During normal operation, the liquid is collected in the tray 20 to a normal operating liquid level 40. Because the liquid level on the tray may vary during operation, the normal operating liquid level 40 is typically considered to be the maximum liquid level under normal operating conditions. The vapor, on the other hand, tends to flow radially outwardly above the liquid along vapor flowpath 42 toward the annular opening 34 between the rough distribution tray 20 and the reactor walls 6. As vapor entering the space above the rough distribution tray 20 will typically pass through a center portion of the opening 18, while the liquid typically flows radially outside of the vapor through the opening 18, liquid may become entrained in the vapor as the vapor passes through the liquid. The entrained liquid may then flow along the vapor flowpath 42 with the vapor.

A relatively large amount of height is required in previous systems between the rough liquid distribution tray 20 and the bottom tray 44 of the mixing chamber 16 and between the rough liquid distribution tray 20 and the fine distribution tray 24 due to high outward radial vapor flow above the rough liquid distribution tray 20 and high inward radial vapor flow above the fine distribution tray 24. The large space is necessary in current systems to control liquid entrainment due to the large radial flow of vapor flowing radially from the outlet 18 to the annular opening 34. It is also needed to control the radial vapor pressure gradient above the fine distribution tray 24 due to the large inward radial vapor flow, which may otherwise affect the liquid level on the fine distribution tray, leading to poor liquid distribution therebelow. The excessive liquid entrainment and radial vapor pressure gradient can increase fluid maldistribution of the fine distribution tray 24 and result in a large temperature spread in the catalyst bed below.

By one aspect, in order to allow for a reduction in the height of the space between the rough distribution tray 20 and the mixing chamber bottom tray 44 and between the rough distribution tray 20 and the fine distribution tray 24, at least one rough distribution tray vapor chimney 50 is provided on the rough distribution tray. The vapor chimney 50 is positioned radially outwardly of the mixing chamber outlet 18. An upper opening 51 of the distribution tray vapor chimney 50 is positioned above a normal operating liquid level of the distribution tray to restrict liquid from entering into the chimney 50. The vapor chimney provides fluid communication from above to below the rough distribution tray 20. The vapor chimney 50 includes a vapor chimney body 52 including one or more sidewalls 54. By one aspect the vapor chimney body has a cross section that is tapered radially inwardly toward the center of the rough distribution tray 20.

By one approach, a plurality of vapor chimneys 50 are provided on the rough liquid distribution tray and are arranged circumferentially thereabout. The plurality of vapor chimneys are spaced circumferentially from one another to provide fluid flowpaths 56 therebetween. The plurality of vapor chimneys 50 may not all have the same shape and may not all have the same inwardly tapered configuration. However, it is preferred that at least some of the plurality of vapor chimneys 50 have an inwardly tapered body 52 to provide a relatively wide fluid flowpath 56 between adjacent vapor chimneys 50. It has been identified that this configuration minimizes obstruction to the flow of fluids radially outwardly on and above the rough distribution tray 20. The chimney also serves to dampen the rotational flow of fluid above the rough distribution tray 20, which may otherwise continue with rotational flow in the space above the fine distribution tray 24, which has also been identified to affect the liquid level above the fine distribution tray. To this end, in one example a ratio of a width of an inner side portion to a width of an outer side portion of the distribution tray vapor chimney body is between about 0.01 and about 0.9 and between about 0.1 and about 0.5 in another example. The elongated chimneys also provide a large area between the chimney top and the bottom of the mixing chamber for vapor flow into the chimneys so that the space between the two can be minimized.

It has been found that by including a vapor chimney 50 in accordance with the teachings herein, as vapor passes radially above the rough distribution tray 20, at least a portion of the vapor passes through the vapor chimney to reduce the radial vapor flow and velocity above and below the rough distribution tray 20. In this regard, including one or more vapor chimneys 50 on the rough distribution tray 20 reduces the radial pressure gradient above the fine distribution tray 24 resulting in improved subsequent fluid distribution below the fine distribution tray 24. As a result, it has been found that the vertical height above and below the rough distribution tray 20 can be reduced by up to about 200 mm, while providing similar or improved performance.

In one approach, a ratio of the open area of the distribution tray vapor chimneys 50 to a total open area of both the annular opening 34 and the vapor chimneys 50 is between about 20% to about 100%, between about 30% to about 80% in another example, and between about 40% to about 70% in yet another example. It has been identified that providing a relative open area of the vapor chimneys in this range provides maximum reduction of the radial pressure gradient about the fine distribution tray 24.

One surprising finding from Computational Fluid Dynamics (CFD) simulation is that reverse vapor flow from below to above the rough distribution tray through a radially inner portion of the chimneys may occur if the vapor static pressure above the rough distribution tray is significantly lower than that below the tray due to relatively higher vapor kinetic pressure above the tray at the same vertical locations and low vapor flow frictional loss through the tray. This problem may occur with long chimneys on large trays having high vapor flows and can be solved by restricting vapor flow into the annular zone and vapor chimneys. One way that has been identified to restrict vapor flow and increase vapor flow frictional loss across the rough distribution tray is to limit the spaces between the top of the vapor chimneys and the mixing chamber and between the rough distribution tray retention weir and the mixing chamber or collection tray so that the static pressure above the vapor chimney is higher than the static pressure below the chimney.

Turning to more of the particulars, by one aspect, the distribution tray vapor chimney 50 includes the sidewalls which generally surround a distribution tray vapor outlet opening 58. The upper vapor chimney opening 51 may be provided as an open top of the chimney 50 as illustrated in the figures or an aperture through the chimney wall 54. Unless specified, as used herein, upper opening refers to one or more openings that are elevated above a tray and/or liquid level, for example the rough distribution tray 20 or the liquid level on the rough distribution tray 20. The upper vapor chimney opening 51 is preferably positioned at a height above a normal operating liquid level on the rough distribution tray to restrict liquid from entering the chimney 50 and passing through the vapor outlet 58 with the vapor.

The vapor chimney 50 may extend through the rough distribution tray 20 or may only extend upwardly therefrom.

The vapor chimney body 52 can include a variety of inwardly tapered cross-sectional shapes, for example, but not limited to triangular, trapezoidal, and pi-shaped.

In one example, the vapor chimney 50 is positioned such that the center of its weighted open area is between about 30% to about 80% of the total radius of the rough liquid distribution tray, between about 40% and about 75% in another example, and between about 50% and about 70% in yet another example. Without going into detail herein, the weighted open area of the vapor chimney opening can be calculated in the same manner as determining the center of mass by treating the vapor chimney open area as a solid body having consistent thickness and density, as is generally known. It has been identified that providing the vapor chimney 50 at this position improves the distribution of vapor flow therethrough, maximizing the reduction of the radial pressure gradient above the fine distribution tray 24.

Figure 3:
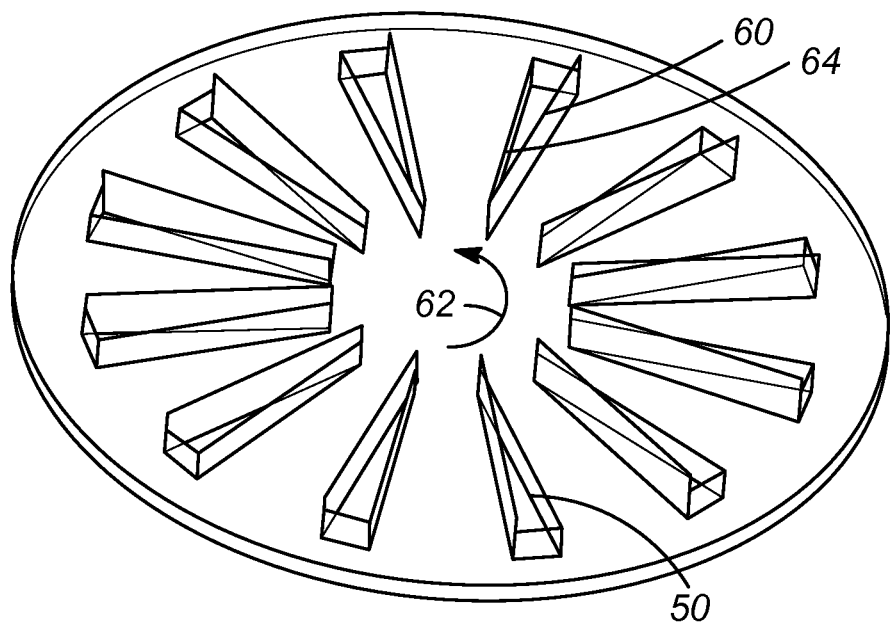
FIG. 3 is a perspective view of a rough distribution tray having vapor chimneys.

As fluid flows into the rough distribution zone from the mixing chamber outlet 18, it will include a radial as well as circumferential, swirling, component. In one approach as illustrated in FIG. 3, the vapor chimney 50 includes an upstream sidewall 60 relative to the swirling flow 62 of process fluid that extends higher above the rough distribution tray 20 than a downstream sidewall 64. By one approach, the upstream sidewall 60 may extend all the way to the bottom tray of the mixing chamber 16. In this manner, liquid that may be entrained in vapor as the fluid passes into the rough distribution zone will be restricted from entering the vapor chimney 50, and may be separated from the vapor and collected on the rough distribution tray 20. The extended side wall 60 also enhances the damping of swirling fluid flow on rough distribution tray.

While various mixing chambers may be utilized in accordance with various aspects, as are generally known in the art, in one approach, the mixing chamber 16 may include a bottom plate or tray 44 affixed to the bottom of the collection tray 12 by a sidewall or sidewalls 46. An outlet 18 may be included near or at a center portion of the mixing chamber 16. The sidewalls 46 may include a single continuous sidewall that may be generally round or have another shape. In this regard, the collection tray bottom may form the top of the mixing chamber 16. As illustrated in FIG. 1, the sidewall includes round sidewall 46 to facilitate the swirling fluid flow in the mixing chamber 16. The outlet 18 may comprise a center opening to allow the passage of fluids therethrough, with a weir 17 surrounding the opening to retain a liquid level above the bottom tray 44 during mixing of fluids in the chamber 16.

Figure 4:
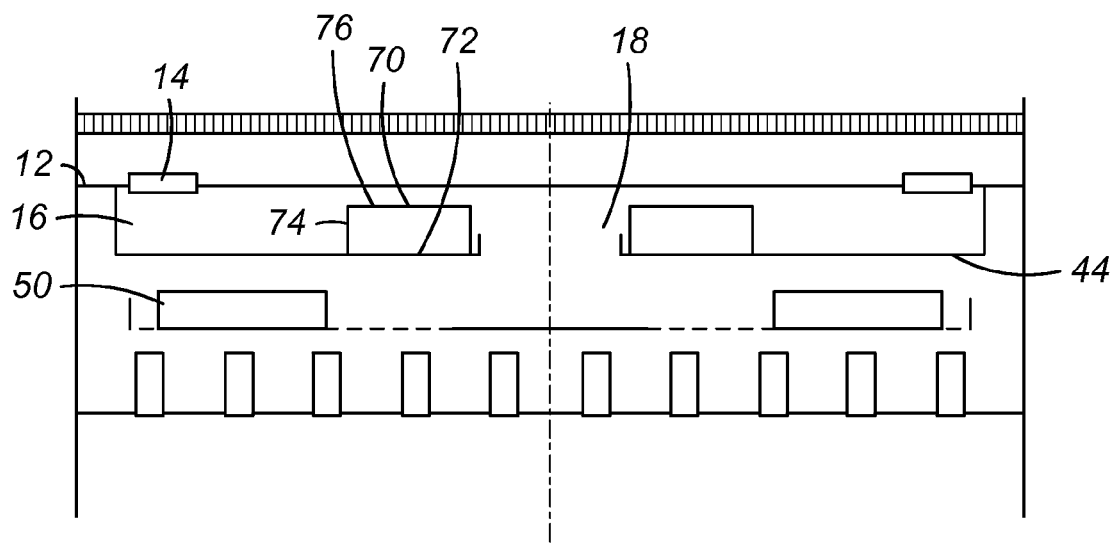
FIG. 4 is a schematic cross-section of a device for the collection, mixing and distribution of fluid between catalyst beds in accordance with various aspects including a mixing chamber vapor chimney.

Turning to FIG. 4, by one aspect, the mixing chamber 16 includes at least one mixing chamber vapor chimney 70 positioned within the mixing chamber 16 for providing fluid communication between the mixing chamber and the rough distribution tray 20 therebelow. The mixing chamber vapor chimney 70 and surrounds a mixing chamber vapor outlet opening 72. The vapor chimney 70 includes a chimney wall 74 that extends up from the mixing chamber bottom tray 44 and includes an upper chimney inlet or opening 76 to provide for passage of vapor into the chimney 70 and through the vapor outlet opening 72.

The device 10 can also include a quench gas injection into the space between the catalyst beds 30, 32. When there is a quench gas injection, it is preferred to inject the quench gas in the vapor space above the collection tray 12 as is generally known to those of ordinary skill in the art. A cool quench gas may be injected at a position near the center axis, and sprayed in an outward radial direction or near the reactor walls and sprayed in an inward radial direction above the collection tray. The spray contacts the vapor and liquid flowing downward from the reactor bed above the quench zone. Heat transfer between the two gases is generally a matter of gas mixing which depends on the momentum exchange between the two vapor streams. Heat transfer to the liquid is typically through the transfer of heat across the liquid droplet surface area. The upper vapor chimney opening 76 is preferably positioned at a height above the mixing chamber bottom tray 44 above a normal operating liquid level.

The vapor chimney 70 is preferably positioned radially outwardly of the mixing chamber outlet 18. In this manner, at least a portion of the vapor within the mixing chamber 16 will pass through the vapor chimneys 70 to the rough distribution tray 20 therebelow rather than passing through the mixing chamber outlet 18 as it flows radially inwardly through the mixing chamber 16 with a swirling motion. As a result, the vapor will be positioned radially outwardly of the liquid exiting the mixing chamber outlet 18 so that it does not pass through the falling liquid. In this regard, the amount of turbulent vapor flow and liquid entrainment within the vapor along the rough distribution tray 20 is reduced. In one approach, the mixing chamber outlet 18 may include a generally central outlet opening and a plurality of vapor chimneys 70 may be arrayed circumferentially about the central opening 18.

By one approach, the distribution tray vapor chimneys 50 are positioned radially outwardly of the mixing chamber vapor chimneys 70 to restrict liquid that is entrained in vapor passing through a mixing chamber vapor chimney 70 from passing into a distribution tray vapor chimney 50. For a similar reason the distribution tray vapor chimneys 50 are positioned radially outwardly of the mixing chamber outlet 18 as described previously.

Figure 5:
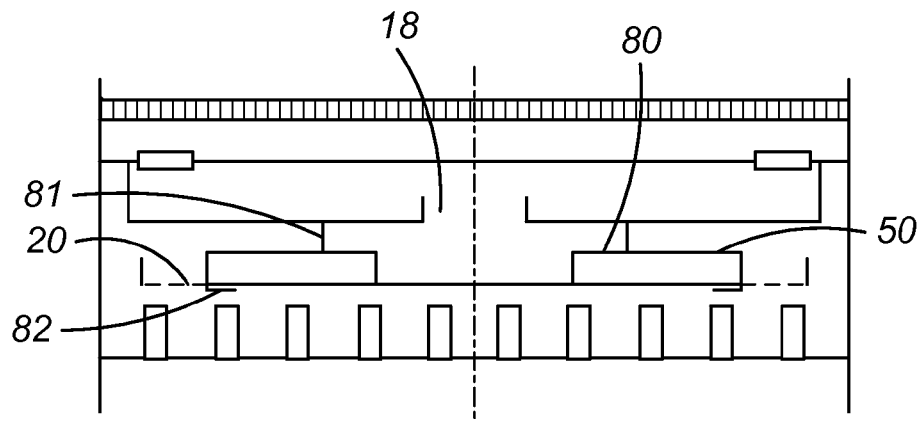
FIG. 5 is a schematic cross-section of a device for the collection and distribution of fluid between catalyst beds in accordance with various aspects.
Figure 6:
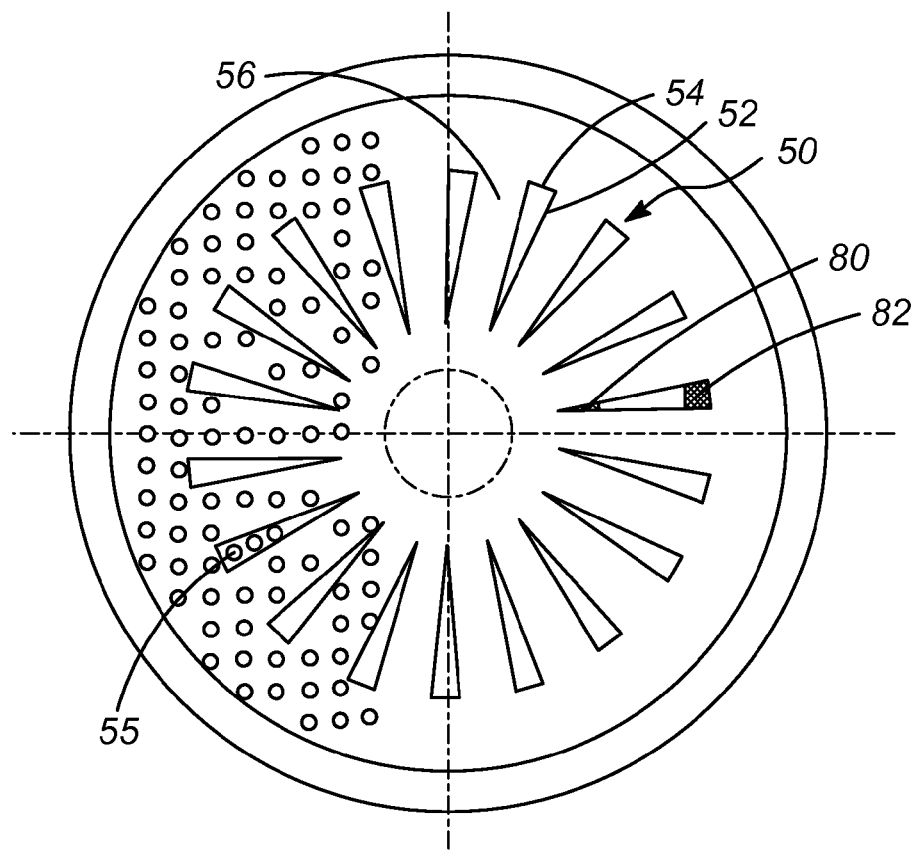
FIG. 6 is a schematic plan view of a rough distribution tray having vapor chimneys in accordance with various aspects.

In addition, according to one approach, as illustrated in FIGS. 5-6, a distribution tray vapor chimney cap 80 may be provided to cover a radially inner top portion of the distribution tray vapor chimney to restrict at least a portion of liquid entrained in vapor flowing from the mixing chamber from entering the distribution tray vapor chimney opening and bypassing the distribution tray liquid outlet ports 36. The cap may include a baffle 81 extending upwardly to restrict the radial flow of fluid over the vapor chimney to restrict entrained liquid from entering the chimney 50. Alternatively or in addition, a vapor chimney baffle 82 may be provided at a radially outer bottom portion of the distribution tray vapor chimney opening 59. The baffle 82 directs vapor flowing radially outwardly and through the chimney 50 in the opposite direction. In this regard, the vapor will be urged to flow radially inwardly as it passes above the fine distribution tray 24 to reduce the radial pressure gradient above the fine distribution tray 24. The combination of baffles 80 and 82 also reduces tendency of reverse vapor flow through radially inner portion of the vapor chimney.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A device for the distribution of fluid over the top of a reactor bed, comprising:
   a collection tray having a top and a bottom, and having outlet ports therethrough;
   a mixing chamber in fluid communication with the collection tray outlet ports, and having a mixing chamber outlet;
   a rough distribution tray in fluid communication with the mixing chamber outlet having rough distribution tray liquid outlet ports therethrough;
   a distribution tray vapor chimney of the distribution tray positioned radially outwardly of the mixing chamber outlet;
   an upper opening of the distribution tray vapor chimney above a normal operation liquid level of the distribution tray and providing fluid communication from above to below the rough distribution tray;
   a vapor chimney body having a radially inwardly tapered cross section to reduce restriction of outward fluid flow along the rough distribution tray and to damp swirling fluid flow on the rough distribution tray.

2. The device of claim 1, wherein the distribution tray vapor chimney body includes a cross section selected from one of a triangular cross section, a trapezoidal cross section, and a pie-shaped cross section.

3. The device of claim 1, wherein the distribution tray vapor chimney opening has a weighted open area center positioned at a radius from a center of the rough liquid distribution tray of between about 50-70% of a total radius of the rough liquid distribution tray.

4. The device of claim 1, wherein a ratio of a width of an inner side portion to a width of an outer side portion of the distribution tray vapor chimney body is between about 0.01-0.9.

5. The device of claim 1, wherein a ratio of a width of an inner side portion to a width of an outer side portion of the distribution tray vapor chimney body is between about 0.1-0.5.

6. The device of claim 1, wherein the distribution tray vapor chimney includes an upstream sidewall and a downstream sidewall relative to a swirling flow of process fluid as it enters the rough distribution tray during operation and wherein the upstream chimney sidewall extends higher above the rough distribution tray than the downstream chimney sidewall.

7. The device of claim 1, further comprising a plurality of distribution tray vapor chimneys having radially inwardly tapered bodies arrayed circumferentially about the rough distribution tray.

8. The device of claim 7, wherein the plurality of distribution tray vapor chimneys are circumferentially spaced from one another to form a plurality of fluid-flow passageways therebetween.

9. The device of claim 7, further comprising a reactor wall, wherein the rough distribution tray has a smaller diameter than a diameter of the reactor wall, and
a generally annular opening between the rough distribution tray and the reactor wall to provide a flow path for vapor to flow beneath the rough distribution tray.

10. The device of claim 9, wherein a ratio of the open area of the distribution tray vapor chimney opening to a total open area of the annular opening and the vapor chimney opening is between about 30-70%.

11. The device of claim 1, further comprising a distribution tray vapor chimney cap at a radially inner top portion of the distribution tray vapor chimney to restrict at least a portion of liquid entrained in vapor flowing from the mixing chamber from entering the distribution tray vapor chimney opening and bypassing the distribution tray liquid outlet ports and to reduce reverse vapor flow tendency through the chimney.

12. The device of claim 1 further comprising a vapor chimney baffle obstructing a radially outer bottom portion of the distribution tray vapor chimney opening to urge at least a portion of vapor passing through the distribution tray vapor chimney radially inward toward a center portion of the rough liquid distribution tray to decrease a radial vapor pressure gradient below the rough distribution tray.

13. The device of claim 1, wherein the distribution tray vapor chimney is positioned radially outwardly of the mixing chamber opening to restrict liquid passing through the mixing chamber outlet from passing through the distribution tray vapor chimney.

14. The device of claim 1, wherein the mixing chamber includes a mixing chamber vapor chimney having an upper opening to provide fluid communication between the mixing chamber and the rough distribution tray and wherein the distribution tray vapor chimney is positioned radially outwardly of the mixing chamber vapor chimney to restrict liquid entrained in vapor passing through the mixing chamber vapor chimney from passing through the distribution tray vapor chimney.

15. A rough distribution device for use in a downflow reactor, the rough distribution device comprising:
a rough distribution tray including a plurality of liquid outlet ports therethrough for gathering liquid and distributing the liquid therebelow;
a distribution tray vapor chimney of the rough distribution tray formed about at least one vapor outlet port; and
an upper opening of the distribution tray vapor chimney above a normal operation liquid level of the distribution tray and providing fluid communication from above to below the rough distribution tray;
a vapor chimney body having a radially inwardly tapered cross section to reduce restriction of outward fluid flow along the rough distribution tray.

16. The rough distribution device of claim 15, further including a vapor chimney cap at a radially inner top portion of the distribution tray vapor chimney to restrict at least a portion of liquid entrained in vapor flowing above the rough distribution tray from entering the distribution tray vapor chimney and bypassing the distribution tray liquid outlet ports.

17. The rough distribution device of claim 15, wherein the distribution tray vapor chimney has a weighted center of open area that is positioned at a radius from a center of the rough liquid distribution tray of between about 50-70% of a total radius of the rough liquid distribution tray.

18. The rough distribution device of claim 15, further comprising a plurality of distribution tray vapor chimneys having radially inwardly tapered bodies arrayed circumferentially about the rough distribution tray.

19. The rough distribution device of claim 15, wherein the plurality of vapor chimneys are circumferentially spaced from one another to form a plurality of fluid-flow passageways therebetween.

20. The rough distribution device of claim 15, wherein a ratio of a width of an inner side portion to a width of an outer side portion of the distribution tray vapor chimney body is between about 0.01-0.5.

* * * * *